(12) United States Patent
Hsia (10) Patent No.: US 12,238,835 B2
(45) Date of Patent: Feb. 25, 2025

(54) LINEAR SOLID-STATE LIGHTING WITH LOW EMERGENCY POWER AND AUTO-TESTS

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 102 days.

(21) Appl. No.: 18/228,595

(22) Filed: Jul. 31, 2023

(65) Prior Publication Data

US 2023/0389154 A1    Nov. 30, 2023

Related U.S. Application Data

(63) Continuation-in-part of application No. 17/717,838, filed on Apr. 11, 2022, now Pat. No. 11,846,396, which is a continuation-in-part of application No. 17/696,780, filed on Mar. 16, 2022, now Pat. No. 11,946,626, which is a continuation-in-part of application No. 17/405,203, filed on Aug. 18, 2021, now Pat. No. 11,283,291, which is a continuation-in-part of application No. 17/329,018, filed on May 24, 2021, now Pat. No. 11,303,151,
(Continued)

(51) Int. Cl.
*H05B 45/3578* (2020.01)
*H02J 7/00* (2006.01)
*H02J 7/02* (2016.01)
*H05B 45/30* (2020.01)
*H05B 45/38* (2020.01)
*H05B 45/58* (2020.01)
*H05B 47/17* (2020.01)

(52) U.S. Cl.
CPC ...... *H05B 45/3578* (2020.01); *H02J 7/00714* (2020.01); *H05B 45/30* (2020.01); *H05B 45/38* (2020.01); *H05B 45/58* (2020.01); *H05B 47/172* (2024.01); *Y02B 20/30* (2013.01)

(58) Field of Classification Search
None
See application file for complete search history.

(56) References Cited

U.S. PATENT DOCUMENTS

| | | | | |
|---|---|---|---|---|
| 2017/0261199 A1* | 9/2017 | Horng | ............... | H05B 47/17 |
| 2020/0015334 A1* | 1/2020 | Hsia | ............... | H02J 9/061 |
| 2020/0259359 A1* | 8/2020 | Hsia | ............... | H05B 45/3725 |

* cited by examiner

*Primary Examiner* — Anh Q Tran
(74) *Attorney, Agent, or Firm* — Andy M. Han; Han IP PLLC (57) ABSTRACT

A linear light-emitting diode (LED) lamp comprising an emergency circuit is used to replace a luminaire operated in a normal circuit with alternate-current (AC) mains. The normal circuit comprises a step-down regulator circuit and a load control relay whereas the emergency circuit comprises a rechargeable battery, a step-up regulator circuit, and a self-diagnostic circuit. The linear LED lamp can be auto-switched from a normal mode to an emergency mode according to availability of the AC mains and whether a rechargeable battery test is initiated. The load control relay is configured to convey a forward electric current and a reverse electric current to and from the LED arrays. The self-diagnostic circuit is configured to provide a test sequence and to auto-evaluate battery performance. The step-up regulator circuit adopts an unconventional low power scheme to prolong an emergency lighting time using a limited power of the rechargeable battery.

19 Claims, 4 Drawing Sheets

Related U.S. Application Data which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation of application No. 14/135,116, filed on Dec. 19, 2013, now Pat. No. 9,163,818, which is a continuation of application No. 13/525,249, filed on Jun. 15, 2012, now Pat. No. 8,749,167.

LINEAR SOLID-STATE LIGHTING WITH LOW EMERGENCY POWER AND AUTO-TESTS

CROSS-REFERENCE TO RELATED APPLICATIONS

The present disclosure is part of a continuation-in-part (CIP) application of U.S. patent application Ser. No. 17/717,838, filed 11 Apr. 2022, which is part of CIP application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021 and issued as U.S. Pat. No. 11,303,151 on 12 Apr. 2022, which is part of CIP application of U.S. patent application Ser. No. 17/313,988, filed 6 May 2021 and issued as U.S. Pat. No. 11,264,831 on 1 Mar. 2022. Contents of the above-identified applications are incorporated herein by reference in their entirety.

BACKGROUND

Technical Field

The present disclosure relates to linear light-emitting diode (LED) lamps and more particularly to a linear LED lamp that includes a low emergency power circuit and a self-diagnostic circuit to auto-test a terminal voltage of a rechargeable battery in operating such a dual mode LED lamp at all times.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that the total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built a long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From an energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a self-diagnostic mechanism such that after the LED lamp or the LED luminaire is installed on a ceiling or a high place in a room, the self-diagnostic mechanism can work with an emergency battery backup system to periodically auto-test rechargeable battery to meet regulatory requirements without safety issues. To meet UL (Underwriters Laboratories) safety standard for emergency lighting and power equipment, the emergency battery backup system must consume a limited emergency power with an automatic load control relay in controlling the system's operations. It is, therefore, a manufacturer's responsibility to design and develop such a low emergency power's system, controlling a forward electric current and a reverse electric current to and from LED arrays in the LED luminaire using the automatic load control relay to reliably operate the multi-function LED lamps with the emergency light package integrated with the normal lighting.

SUMMARY

A linear LED lamp is used to replace a fluorescent or an LED lamp normally operated with the AC mains in a normal mode. The linear LED lamp comprises an emergency-operated portion and one or more LED arrays with a forward voltage across thereof. The emergency-operated portion comprises a rechargeable battery, a control and test circuit, and a step-up regulator circuit configured to use a power from the rechargeable battery and to provide an emergency power (i.e., a voltage and a current) to drive the one or more LED arrays when a line voltage from the AC mains is unavailable. The linear LED lamp further comprises a normally-operated portion originally designed to receive the line voltage from the AC mains for general lighting applications. The normally-operated portion comprises at least two electrical conductors, "L" and "N", at least one full-wave rectifier, and a step-down regulator circuit. The at least one full-wave rectifier is configured to convert a line voltage from the AC mains into a primary direct-current (DC) voltage. In other words, the at least two electrical conductors, "L" and "N" are coupled to an un-switched power, in which the normally-operated portion cannot be turned off when the linear LED lamp is not in use or during nighttime. The un-switched power ensures that the rechargeable battery always receives the un-switched power from the line voltage. The step-down regulator circuit comprises a second inductor and a power switching control circuit. The power switching control circuit is coupled to the at least one full-wave rectifier and configured to allow the step-down regulator circuit to generate a second LED driving current to power up the one or more LED arrays at a full power when the line voltage is available.

The one or more LED arrays comprises an input near a first terminal LED+ and an output near a second terminal LED−. The input and the output are configured to receive an LED driving current from the first terminal LED+ and to return from the second terminal LED− to either the step-up regulator circuit or the normally-operated portion, depending on which one is an LED driving current source. For example, the step-down regulator circuit is a normally-operated current source so that the second LED driving current is provided to the one or more LED arrays to operate thereon.

The emergency-operated portion further comprises a power source configured to pre-powers the emergency-operated portion. The rechargeable battery comprises a high-potential electrode and a low-potential electrode with a terminal voltage across thereon. The power source provides a DC power to charges the rechargeable battery to reach a nominal value of the terminal voltage. Please note that the terminal voltage of the rechargeable battery may be slightly less than the nominal value because the rechargeable battery ages or an ambient temperature is below an optimum operating temperature. When the rechargeable battery badly ages or goes wrong, the terminal voltage may be far from the nominal value. That is why a rechargeable battery test is needed to ensure that the rechargeable battery is working all the time, especially in an event of power outage. The control and test circuit further comprises a test portion configured to examine a fraction of the terminal voltage on the rechargeable battery. The control and test circuit may further comprise a power failure detection circuit configured to detect whether the line voltage is available or not. According to this detection, the control and test circuit is configured to either enable or to disable the step-up regulator circuit. To enable the step-up regulator circuit, the control and test circuit must send a logic high level signal to the step-up regulator circuit to initiate an electronic switching in the step-up regulator circuit.

The step-up regulator circuit according to the present disclosure, very different from a conventional boost converter circuit, comprises a first inductor, at least three diode rectifiers, and three or more capacitors. The step-up regulator circuit is configured to energetically charge the three or more capacitors in multiple stages to convert the terminal voltage of the rechargeable battery into controllable energy pulses, followed by the three or more capacitors, thereby building a regulated output voltage greater than the forward voltage with a first LED driving current. Charging the three or more capacitors in the multiple stages to achieve the regulated output voltage high enough to operate the one or more LED arrays has an advantage of very high conversion efficiency, thereby prolonging an operating time of emergency lighting using a limited power of the rechargeable battery. That is, the step-up regulator circuit is regarded as a low emergency power circuit and can consume less power than the conventional boost converter circuit does. The control and test circuit further comprises a first control port configured to output the first control signal to the step-up regulator circuit and to initiate the electronic switching in the step-up regulator circuit when either the line voltage is not available or the rechargeable battery test is initiated.

The linear LED lamp further comprises a load control relay circuit comprising a voltage sensing coil and configured to control the second LED driving current to flow into and out of the one or more LED arrays, transferring a power to the one or more LED arrays. The power switching control circuit further comprises a third control port configured to receive a second control signal from the control and test circuit and to either enable or disable the step-down regulator circuit. That is, when the step-up regulator circuit is turned on by the control and test circuit, the second control signal is sent to turn off the step-down regulator circuit. In other words, when the rechargeable battery test is initiated, the second LED driving current is interrupted with an output of the step-down regulator circuit vanishing.

The load control relay circuit further comprises a first pair of electrical terminals, a second pair of electrical terminals, and a third pair of electrical terminals. The first pair of electrical terminals are configured to couple to the step-down regulator circuit and to relay the second LED driving current to flow into the one or more LED arrays. The second pair of electrical terminals are configured to relay the second LED driving current returned from the one or more LED arrays to flow into a ground reference of the step-down regulator circuit. The third pair of electrical terminals are configured to couple to the terminal voltage of the rechargeable battery to operate the voltage sensing coil.

The control and test circuit further comprises a self-diagnostic circuit comprising at least one timer. The at least one timer comprises a first time delay and a second time delay. Upon application of the DC power to the self-diagnostic circuit, the first time delay begins. At an end of the first time delay an output of the self-diagnostic circuit is energized and remains energized with a logic high level so as to activate the step-up regulator circuit for the second time delay. At an end of the second time delay the output of the self-diagnostic circuit is de-energized so as to drop to a logic low level to disable the step-up regulator circuit. The first time delay and the second time delay form a sequence. The sequence repeats until the DC power is removed from the self-diagnostic circuit. During the second time delay, the control and test circuit allows the self-diagnostic circuit to integrate with the test portion and to perform a rechargeable battery test. When the rechargeable battery test is initiated, the load control relay circuit is configured to forbid the second LED driving current to flow into the one or more LED arrays. The control and test circuit further comprises a peripheral circuit configured to sample a fraction of the LED forward voltage and to deliver to the test portion to examine during the second time delay when the rechargeable battery test is initiated. The control and test circuit further comprises at least one status indicator configured to show a result of the rechargeable battery test. The control and test circuit further comprises a test switch configured to manually initiate the rechargeable battery test. When the rechargeable battery test is manually initiated, the self-diagnostic circuit is configured to ignore the first time delay and to activate the output of the self-diagnostic circuit to reach the logic high level and remains activated so as to enable the step-up regulator circuit for the second time delay. At an end of the second time delay, the output of the self-diagnostic circuit is inactivated to drop to the logic low level to disable the step-up regulator circuit. During the second time delay, the self-diagnostic circuit is configured to allow the test portion to perform a rechargeable battery test, as mentioned above. The test switch is further configured to manually cause or trigger the self-diagnostic circuit to terminate the rechargeable battery test that is in progress.

The emergency-operated portion further comprises a first voltage detection circuit configured to compare the terminal voltage with a charging voltage and to detect whether the rechargeable battery is in a charged condition at all times when the line voltage is available. The first voltage detection circuit may comprise an operational amplifier with two input ports each respectively receives the terminal voltage and the charging voltage whereas an output of the operational amplifier dictates either a logic low level or a logic high level, respectively depending on whether the charging voltage is greater than the terminal voltage or not.

The control and test circuit further comprises a second voltage detection circuit configured to provide an indication of whether the step-up regulator circuit is activated with an emergency lighting powered on or not. The control and test circuit further comprises an electronic switch configured to control the terminal voltage to apply and to operate the voltage sensing coil. The electronic switch comprises either a metal-oxide-semiconductor field-effect transistor (MOSFET) or a bipolar junction transistor (BJT). The control and test circuit further comprises a power failure detection circuit configured to couple to the line voltage and to send a power failure signal to the control and test circuit to turn on the step-up regulator circuit.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "primary", a "secondary", a "first", a "second", a "third", and so forth does not necessarily represent a part that is mentioned in an ordinal manner, but a particular one.

DETAILED DESCRIPTION OF THE INVENTION

Figure 1:
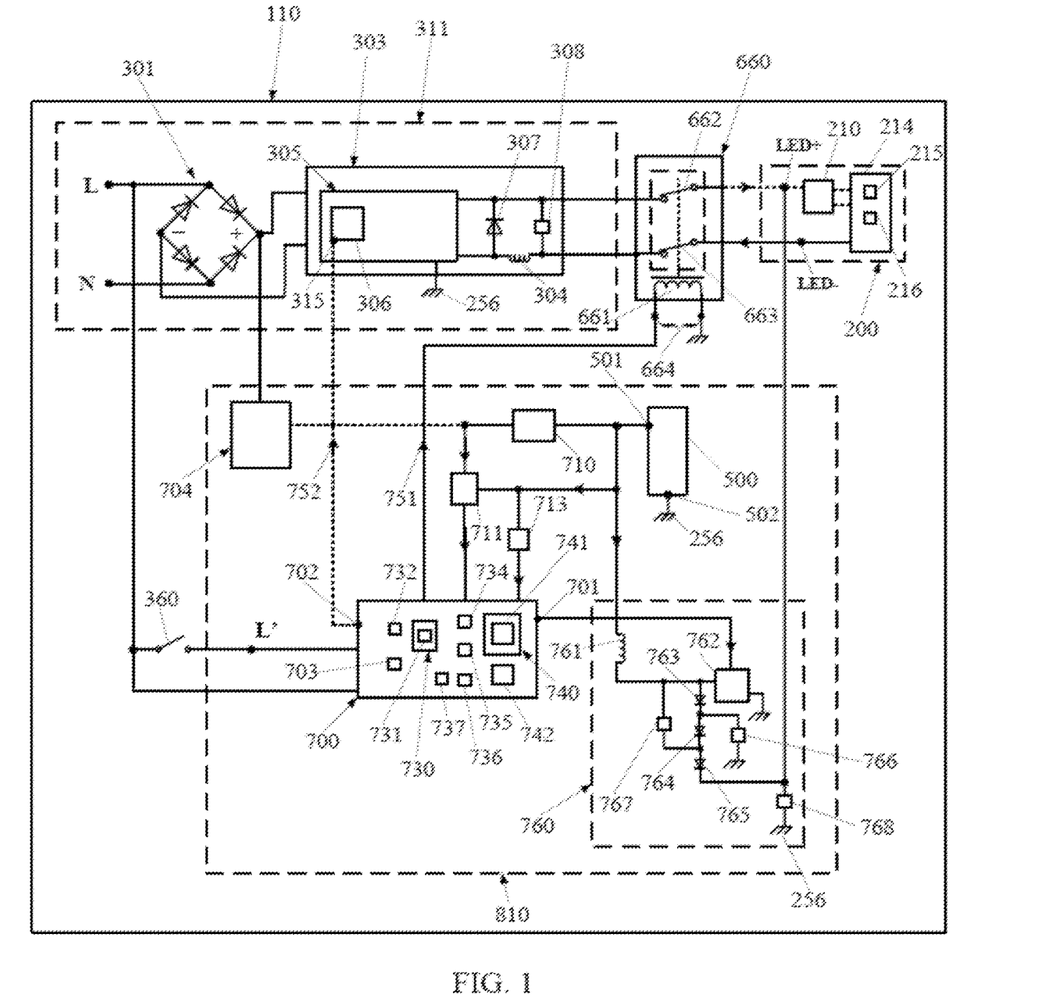
FIG. 1 is a block diagram of a linear LED lamp according to the present disclosure.

FIG. 1 is a block diagram of a linear light-emitting diode (LED) lamp according to the present disclosure. A linear LED lamp 110 is used to replace a fluorescent or an LED lamp normally operated with the AC mains in a normal mode. In FIG. 1, the linear LED lamp 110 comprises a normal driver 311, a load control relay circuit 660, an emergency-operated portion 810, and an LED assembly 200 comprising one or more LED arrays 214 with a forward voltage across thereof. The emergency-operated portion 810 comprises a rechargeable battery 500, a control and test circuit 700, and a step-up regulator circuit 760 configured to transfer a power from the rechargeable battery 500 to provide an emergency power (i.e., a voltage and a current) to drive the one or more LED arrays 214 when the line voltage from the AC mains is unavailable. The normal driver 311 comprises at least two electrical conductors, "L" and "N", at least one full-wave rectifier 301, and a step-down regulator circuit 303. The step-down regulator circuit 303 comprises a second inductor 304 and a power switching control circuit 305. The at least one full-wave rectifier 301 is configured to convert the line voltage from the AC mains into a primary DC voltage. In other words, the at least two electrical conductors, "L" and "N", are coupled to an unswitched power. However, the normal driver 311 can be turned off when the linear LED lamp 110 is not in use or during nighttime by controlling an enabling/disabling port 315 in the power switching control circuit 305. The unswitched power ensures that the rechargeable battery 500 always receives a power from the line voltage to charge.

The power switching control circuit 305 is coupled to the at least one full-wave rectifier 301 and configured to allow the step-down regulator circuit 303 to generate a second LED driving current to power up the one or more LED arrays 214 at a full power when the line voltage is available. The power switching control circuit 305 further comprises a second control device 306 comprising the enabling/disabling port 315 configured to receive a second control signal from the control and test circuit 700 and to either enable or disable the step-down regulator circuit 303. The step-down regulator circuit 303, a normally-operated current source, may further comprise a rectifier 307 and a capacitor 308 and is configured to provide the second LED driving current to the one or more LED arrays 214 to operate thereon. The LED assembly 200 further comprises a first terminal LED+

(i.e., a positive potential terminal of the one or more LED arrays 214) and a second terminal LED−. The first terminal LED+ is configured to receive the second LED driving current in a forward direction whereas the second terminal LED− is configured to receive the second LED driving current returned from the one or more LED arrays 214 in a backward direction. The LED assembly 200 may further comprise an electric current distribution switch 210 coupled to an input of the one or more LED arrays 214. The one or more LED arrays 214 may comprise two types of LEDs with two different correlated color temperatures (CCTs), for example, a first type of LEDs 215 at 3500 Kelvin (K) and a second type of LEDs 216 at 5000 K. The electric current distribution switch 210 is configured to distribute the second LED driving current to flow into the two types of LEDs. When the second LED driving current being equally divided flows into the first type of LEDs 215 and the second type of LEDs 216, a third CCT at 4000 K appears as a result of color-mixing of the two different CCTs. The electric current distribution switch 210 is thereby configured to distribute the second LED driving current to flow into the first type of LEDs 215 and the second type of LEDs 216 resulting in an apparent light emission at a third CCT as a result of color-mixing of light emissions from both the first type of LEDs 215 and the second type of LEDs 216.

As shown in FIG. 1, the second LED driving current flowing in both directions is via the load control relay circuit 660, quite different from a conventional non-load control approach. The load control relay circuit 660 comprises a voltage sensing coil 661 and is configured to control the second LED driving current to flow into and out of the one or more LED arrays 214. The load control relay circuit 660 further comprises a first pair of electrical terminals 662, a second pair of electrical terminals 663, and a third pair of electrical terminals 664. The first pair of electrical terminals 662 are configured to couple to the step-down regulator circuit 303 and to relay the second LED driving current to flow into the one or more LED arrays 214. The second pair of electrical terminals 663 are configured to relay the second LED driving current returned from the one or more LED arrays 214 to flow into a ground reference 256 of the step-down regulator circuit 303. The third pair of electrical terminals 664 are configured to couple to the terminal voltage of the rechargeable battery 500 to operate the voltage sensing coil 661. When the line voltage is available, the voltage sensing coil 661 is operated in a position shown in FIG. 1 with the first pair of electrical terminals 662 and the second pair of electrical terminals 663 respectively electrically conducted. The second LED driving current can therefore flow into and out of the one or more LED arrays 214, continuing a power transfer to the one or more LED arrays 214.

The emergency-operated portion 810 further comprises a power source 704 configured to couple to the at least one full-wave rectifier 301 and to provide a DC power to the control and test circuit 700 and a charging voltage to the rechargeable battery 500, pre-powering the emergency-operated portion 810. The rechargeable battery 500 comprises a high-potential electrode 501 and a low-potential electrode 502 with a terminal voltage across thereon. The power source 704 provides the DC power to charge the rechargeable battery 500 to reach a nominal value of the terminal voltage. Note that the terminal voltage of the rechargeable battery 500 may be slightly less than the nominal value because the rechargeable battery 500 ages or an ambient temperature is below an optimum operating temperature. When the rechargeable battery 500 badly ages or goes wrong, the terminal voltage may be far from the nominal value. That is why the rechargeable battery test is needed to ensure that the rechargeable battery 500 is working all the time, especially in an event of power outage.

The step-up regulator circuit 760 comprises a first inductor 761, a first control device 762, at least three diode rectifiers 763, 764, 765, and three or more capacitors 766, 767, 768. The step-up regulator circuit 760 is configured to energetically charge the three or more capacitors 766, 767, 768 in multiple stages to convert the terminal voltage of the rechargeable battery 500 into controllable energy pulses, followed by the three or more capacitors 766, 767, 768, building a regulated output voltage greater than the forward voltage with a first LED driving current. The regulated output voltage derived from the diode rectifier 765 and the capacitor 768 is coupled to the first terminal LED+ in parallel with an output from the step-down regulator circuit 303 and both ready to operate the one or more LED arrays 214, depending on which one is an LED driving current source. Because the regulated output voltage is applied in front of the electric current distribution switch 210, a proportion of the first LED driving current to flow into the first type of LEDs 215 and the second type of LEDs 216 is the same as the one of the second LED driving current, thereby keeping the third CCT in response to the second LED driving current unchanged.

The control and test circuit 700 may further comprise a power failure detection circuit 703 configured to detect whether the line voltage is available or not. According to this detection, the control and test circuit 700 is configured to enable and to disable the step-up regulator circuit 760. To enable the step-up regulator circuit 760, the control and test circuit 700 must send a logic high level signal to the first control device 762 to initiate an electronic switching in the step-up regulator circuit 760. The control and test circuit 700 further comprises a first control port 701 configured to output the logic high level signal to the first control device 762 and to initiate the electronic switching in the step-up regulator circuit 760 when either the line voltage is not available or the rechargeable battery test is initiated. The control and test circuit 700 further comprises a second voltage detection circuit 732 configured to provide an indication of whether the step-up regulator circuit 760 is activated with an emergency lighting turned on or not.

In FIG. 1, the control and test circuit 700 further comprises a first control circuit 730 comprising an electronic switch 731 configured to be turned on to control the terminal voltage to apply to the voltage sensing coil 661 to operate thereof via a first link 751. The electronic switch 731 may comprise at least one metal-oxide-semiconductor field-effect transistor (MOSFET) or bipolar junction transistor (BJT). When the electronic switch 731 is turned off, the voltage sensing coil 661 is disabled with the second LED driving current interrupted. In that case, the first control circuit 730 may be configured to forbid the second LED driving current to flow into the one or more LED arrays 214 during the rechargeable battery test. The control and test circuit 700 further comprises a second control port 702 configured to output a signal via a second link 752 to turn off the power switching control circuit 305 when the step-up regulator circuit 760 is turned on.

In FIG. 1, the control and test circuit 700 further comprises a test portion 742 and a self-diagnostic circuit 740 comprising at least one timer 741. The at least one timer 741 comprises a first time delay and a second time delay. Upon an initiation of the at least one timer 741, the first time delay begins with an input voltage applied on the self-diagnostic circuit 740. At an end of the first time delay, the output of the self-diagnostic circuit 740 is activated to reach the logic high level and remains activated so as to send a logic high level signal to enable the step-up regulator circuit 760 for the second time delay. At an end of the second time delay, the output of the self-diagnostic circuit 740 is inactivated to drop to the logic low level. During the second time delay the self-diagnostic circuit 740 is allowed to integrate with the test portion 742 and to perform a rechargeable battery test. When the rechargeable battery test is initiated, the control and test circuit 700 is configured to send a logic low level to the step-down regulator circuit 303 and to disable thereof. At the same time, the voltage sensing coil 661 is disabled to forbid the second LED driving current to flow into and out of the one or more LED arrays 214. The emergency-operated portion 810 further comprises a voltage drop circuit 710 configured to be interfaced between the charging voltage provided by the power source 704 and the terminal voltage. The voltage drop circuit 710 may comprise a diode and a resistor. The emergency-operated portion 810 further comprises a first voltage detection circuit 711 configured to compare the terminal voltage with the charging voltage and to detect whether the rechargeable battery is in a charged condition at all times when the line voltage is available. The first voltage detection circuit may comprise an operational amplifier with two input ports each respectively receives the terminal voltage and the charging voltage whereas an output of the operational amplifier dictates either a logic low level or a logic high level, respectively depending on whether the charging voltage is greater than the terminal voltage or not. The control and test circuit 700 may further comprise a first status indicator 734 configured to show a charging status. The control and test circuit 700 may further comprise a second status indicator 735 configured to show that the step-up regulator circuit 760 is enabled with a status of an emergency light "on". The emergency-operated portion 810 may further comprise a peripheral circuit 713 configured to sample a fraction of the terminal voltage and to deliver to the test portion 742 to examine during the second time delay when the rechargeable battery test is initiated. The control and test circuit 700 may further comprise a test switch 736 configured to manually initiate the rechargeable battery test. The test switch 736 is further configured to manually cause or trigger the self-diagnostic circuit 740 to terminate the rechargeable battery test that is in progress. When the rechargeable battery test is manually initiated, the self-diagnostic circuit 740 is configured to ignore the first time delay and to activate the output of the self-diagnostic circuit 740 to reach the logic high level and remains activated so as to enable the step-up regulator circuit 760 for the second time delay. At an end of the second time delay, the output of the self-diagnostic circuit 740 is inactivated to drop to the logic low level. During the second time delay, the self-diagnostic circuit 740 is allowed to integrate with the test portion 742 and to perform a rechargeable battery test, as mentioned above. The control and test circuit 700 further comprises at least one status indicator 737 configured to show a result of the rechargeable battery test.

In FIG. 1, the control and test circuit 700 further comprises an electrical conductor "L'" configured to couple to "L" via an external power switch 360. The power failure detection circuit 703 is further configured to distinguish between a power failure and an external power switch 360 being turned off. When the line voltage is not detected, the control and test circuit 700 sends signals to disable step-down regulator circuit 303 and to enable the step-up regulator circuit 760 to generate the first LED driving current.

The control and test circuit 700 may comprise a microcontroller, a microchip, or a programmable logic controller. In this disclosure, the emergency-operated portion 810 is integrated into the linear LED lamp 110 with the self-diagnostic circuit 740 to auto-test the terminal voltage of the rechargeable battery 500 in charging and discharging conditions with test results displayed in the at least one status indicator 737, supporting dual mode operations of the linear LED lamp 110 to work not only in a normal mode but also in an emergency mode.

Figure 2:
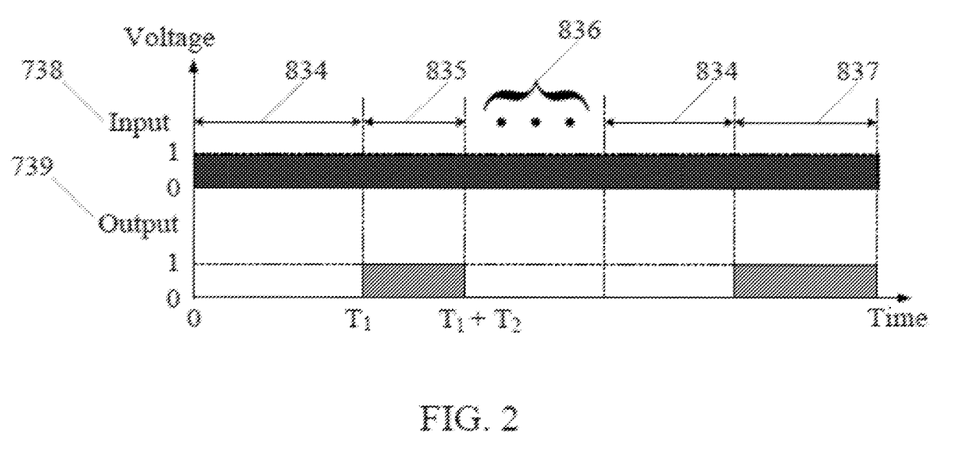
FIG. 2 is a timing diagram of a self-diagnostic circuit according to the present disclosure.

FIG. 2 is a timing diagram of a self-diagnostic circuit according to the present disclosure. As mentioned in depicting FIG. 1, the self-diagnostic circuit 740 comprises the at least one timer 741 and the test portion 742. The at least one timer 741 respectively comprises a first time delay 834 with a duration of T1 and a second time delay 835 with a duration of T2 immediately followed the first time delay 834. Upon an initiation of the at least one timer 741, the first time delay 834 begins with an input voltage 738 applied. At the end of the first time delay 834, an output 739 of the self-diagnostic circuit 740 is activated to reach the logic high level (i.e., "1" state) and remains activated so as to enable the step-up regulator circuit 760 and the test portion 742 for the second time delay 835. At the end of the second time delay 835, the output 739 of the self-diagnostic circuit 740 is inactivated to drop to the logic low level (i.e., "0" state). The first time delay 834 and the second time delay 835 form a primary sequence with a duration of T1+T2. The primary sequence with the duration of T1+T2 repeats eleven times 836 until the terminal voltage (FIG. 1) is removed from the self-diagnostic circuit 740. In FIG. 2, the input 738 shown comprises two states "0" and "1", in which "0" means no voltage appeared at the input 738 of the self-diagnostic circuit 740 whereas "1" means the terminal voltage is applied. Similarly, the output 739 shown comprises two states "0" and "1", in which "0" means no voltage appeared or being inactivated at the output 739 of the self-diagnostic circuit 740 whereas "1" means that the output 739 of the self-diagnostic circuit 740 provides a high-level output voltage or is activated. The duration T2 over the second time delay 835 is configured (e.g., being sufficiently long) to allow the self-diagnostic circuit 740 to perform the rechargeable battery test. It should be the same as the self-diagnostic circuit 740 sends a high-level signal to enable the step-up regulator circuit 760 (in FIG. 1) during the second time delay 835. The first time delay 834 comprises a nominal duration of 30 days. The second time delay 835 comprises a nominal duration of 30 seconds. Specifically, the primary sequence with the duration of T1+T2 repeats eleven times, as mentioned. At the twelfth time, the respective second time delay 837 comprises a nominal duration of 90 minutes. A combination of the primary sequence 834, 835 repeating eleven times 836 and the twelfth time 834, 837 forms a secondary sequence. The secondary sequence repeats until the DC power is removed from the self-diagnostic circuit 740.

Figure 3:
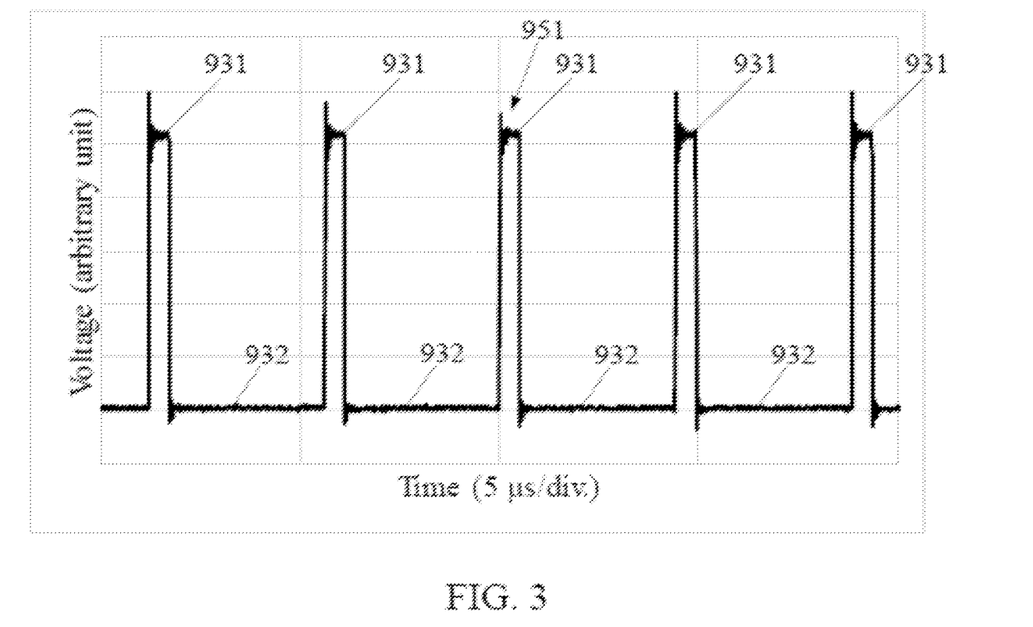
FIG. 3 is an electronic switching waveform according to the present disclosure.
Figure 4:
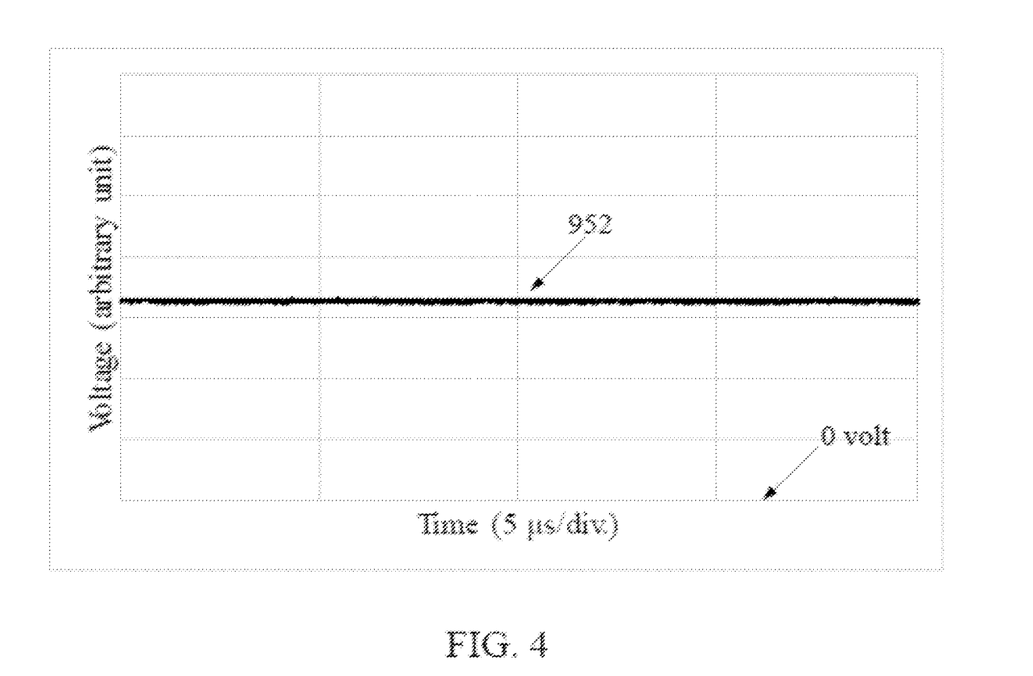
FIG. 4 is a waveform generated by rectifying and filtering according to the present disclosure.
Figure 5:
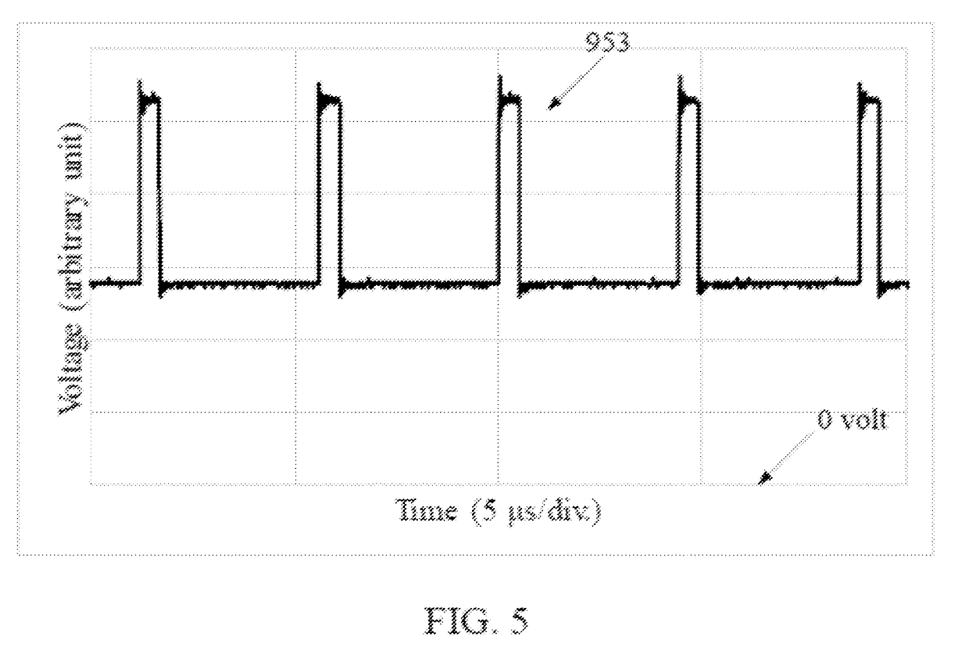
FIG. 5 is a waveform raised by a DC voltage according to the present disclosure.
Figure 6:
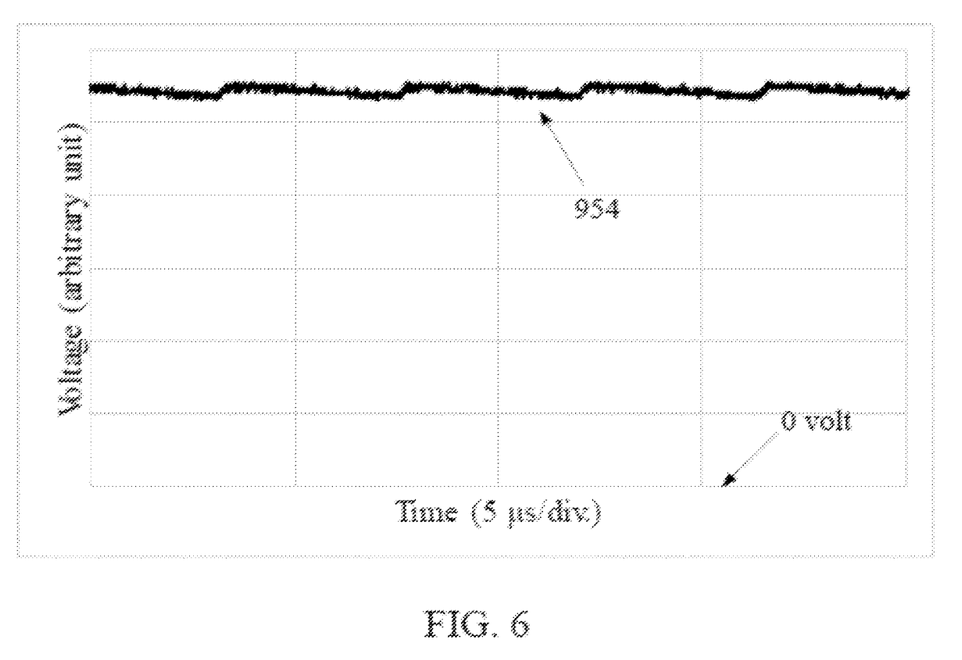
FIG. 6 is a waveform showing a regulated output voltage according to the present disclosure.

FIGS. 3~6 are waveforms of controllable energy pulses and the regulated output voltage according to the present disclosure. Upon receiving the logic high level signal from the first control port 701 (FIG. 1) when either the line voltage is not available or the rechargeable battery test is initiated, the step-up regulator circuit 760 initiates the electronic switching. FIG. 3 is an electronic switching waveform according to the present disclosure. In FIG. 3, an electronic switching waveform 951 comprises switching pulses 931 with respect to a ground reference 932, which is 0 volt. As depicted in FIG. 1, at least three diode rectifiers 763, 764, 765 and three or more capacitors 766, 767, 768 are used to energetically charge the three or more capacitors 766, 767, 768 in a cascaded manner (in multiple stages). The switching frequency of the electronic switching waveform 951 is high enough to ensure that the each of three or more capacitors 766, 767, 768 can be of a small size. FIG. 4 is a waveform generated by rectifying and filtering according to the present disclosure. In FIG. 4, a first DC voltage 952 with respect to the "0" volt is formed by rectifying the electronic switching waveform 951 using a first diode rectifier 763, followed by filtering out a ripple waveform (not shown) using a first capacitor 766. FIG. 5 is a waveform raised by a DC voltage according to the present disclosure. In FIG. 5, a waveform 953 with respect to the "0" volt picks up the electronic switching waveform 951 but is raised by the first DC voltage 952 via a second diode rectifier 764 and a second capacitor 767. FIG. 6 is a waveform showing a regulated output voltage according to the present disclosure. In FIG. 6, the regulated output voltage 954 with respect to the "0" volt is formed by rectifying the waveform 953 using a third diode rectifier 765, followed by a third capacitor 768. The regulated output voltage 954 is, therefore, raised this way to be greater than the forward voltage across the one or more LED arrays 214 to operate thereon with the first LED driving current.

Whereas preferred embodiments of the present disclosure have been shown and described, it will be realized that alterations, modifications, and improvements may be made thereto without departing from the scope of the following claims. Another kind of schemes with an emergency-operated portion with a low emergency power circuit and multiple timers and multiple time delays adopted to operate a linear LED lamp using various kinds of combinations to accomplish the same or different objectives could be easily adapted for use from the present disclosure. Accordingly, the foregoing descriptions and attached drawings are by way of example only and are not intended to be limiting.

What is claimed is:

1. A linear light-emitting diode (LED) lamp, comprising:
   at least two electrical conductors configured to couple to a line voltage from alternate-current (AC) mains;
   one or more LED arrays with a forward voltage across the one or more LED arrays;
   a rechargeable battery with a terminal voltage across thereon;
   at least one full-wave rectifier coupled to the at least two electrical conductors and configured to convert the line voltage into a primary direct-current (DC) voltage;
   a step-up regulator circuit comprising a first inductor, at least three diode rectifiers, and three or more capacitors, the step-up regulator circuit configured to energetically charge the three or more capacitors in multiple stages to convert the terminal voltage of the rechargeable battery into controllable energy pulses, followed by the three or more capacitors, thereby building a regulated output voltage greater than the forward voltage with a first LED driving current;
   a step-down regulator circuit comprising a second inductor and configured to generate a second LED driving current to power up the one or more LED arrays at a full power when the line voltage is available;
   a load control relay circuit comprising a voltage sensing coil and configured to control the second LED driving current to flow into and out of the one or more LED arrays, thereby transferring a power to the one or more LED arrays;
   a control and test circuit comprising a self-diagnostic circuit and configured to enable the step-up regulator circuit and to disable the step-down regulator circuit when either the line voltage is not available or a rechargeable battery test is initiated; and
   a power source configured to couple to the at least one full-wave rectifier and to provide a DC power to the control and test circuit and the rechargeable battery, wherein:
      the load control relay circuit further comprises a first pair of electrical terminals, a second pair of electrical terminals, and a third pair of electrical terminals;
      the first pair of electrical terminals are configured to couple to the step-down regulator circuit and to relay the second LED driving current to flow into the one or more LED arrays;
      the second pair of electrical terminals are configured to relay the second LED driving current returned from the one or more LED arrays to flow into a ground reference of the step-down regulator circuit; and
      the third pair of electrical terminals are configured to be interfaced between the terminal voltage of the rechargeable battery and the voltage sensing coil to operate thereof.

2. The linear light-emitting diode (LED) lamp of claim 1, wherein the self-diagnostic circuit comprises a first time delay and a second time delay, wherein upon application of the DC power to the self-diagnostic circuit, the first time delay begins, wherein at an end of the first time delay, an output of the self-diagnostic circuit is energized and remains energized so as to send a logic high-level voltage to activate the step-up regulator circuit for the second time delay, wherein at an end of the second time delay the output of the self-diagnostic circuit is de-energized, wherein the second time delay and the first time delay form a primary sequence, and wherein the primary sequence repeats until the DC power is removed from the self-diagnostic circuit.

3. The linear light-emitting diode (LED) lamp of claim 2, wherein during the second time delay, the self-diagnostic circuit is configured to send a first control signal to the step-up regulator circuit and to initiate an electronic switching in the step-up regulator circuit so as to enable the step-up regulator circuit while allowing the self-diagnostic circuit to perform the rechargeable battery test.

4. The linear light-emitting diode (LED) lamp of claim 3, wherein the control and test circuit further comprises a test portion configured to examine a fraction of the terminal voltage on the rechargeable battery during the second time delay.

5. The linear light-emitting diode (LED) lamp of claim 3, wherein the step-up regulator circuit further comprises a first control device, and wherein the control and test circuit further comprises a first control port configured to output the first control signal to the first control device and to initiate the electronic switching in the step-up regulator circuit when either the line voltage is not available or the rechargeable battery test is initiated.

6. The linear light-emitting diode (LED) lamp of claim 2, wherein the first time delay comprises a nominal duration of 30 days, and wherein the second time delay comprises a nominal duration of 30 seconds.

7. The linear light-emitting diode (LED) lamp of claim 2, wherein the primary sequence repeats eleven times, and wherein at a twelfth time, the second time delay comprises a nominal duration of 90 minutes.

8. The linear light-emitting diode (LED) lamp of claim 7, wherein a combination of the primary sequence repeating eleven times and the twelfth time forms a secondary sequence, and wherein the secondary sequence repeats until the DC power is removed from the self-diagnostic circuit.

9. The linear light-emitting diode (LED) lamp of claim 1, wherein the control and test circuit further comprises a first voltage detection circuit configured to compare the terminal voltage with a charging voltage and to detect whether the rechargeable battery is in a charged condition at all times when the line voltage is available.

10. The linear light-emitting diode (LED) lamp of claim 9, wherein the control and test circuit further comprises a second voltage detection circuit configured to provide an indication of whether the step-up regulator circuit is activated with an emergency lighting powered on or not.

11. The linear light-emitting diode (LED) lamp of claim 1, wherein the control and test circuit further comprises at least one status indicator configured to show a result of the rechargeable battery test.

12. The linear light-emitting diode (LED) lamp of claim 1, wherein the step-down regulator circuit further comprises a second control device comprising an enabling/disabling port configured to receive a second control signal from the control and test circuit and to either enable or disable the step-down regulator circuit.

13. The linear light-emitting diode (LED) lamp of claim 1, wherein the control and test circuit further comprises an electronic switch configured to control the terminal voltage to apply to the voltage sensing coil to operate thereof.

14. The linear light-emitting diode (LED) lamp of claim 13, wherein the electronic switch comprises either a metal-oxide-semiconductor field-effect transistor (MOSFET) or a bipolar junction transistor (BJT).

15. The linear light-emitting diode (LED) lamp of claim 1, wherein the load control relay circuit is further configured to forbid the second LED driving current to flow into the one or more LED arrays during the rechargeable battery test.

16. The linear light-emitting diode (LED) lamp of claim 1, wherein the control and test circuit further comprises a power failure detection circuit configured to couple to the line voltage, to distinguish between a power failure and an external power switch being turned off, and to send a power failure signal to the control and test circuit to turn on the step-up regulator circuit.

17. The linear light-emitting diode (LED) lamp of claim 1, wherein the control and test circuit further comprises a test switch configured to manually initiate the rechargeable battery test.

18. The linear light-emitting diode (LED) lamp of claim 17, wherein the test switch is further configured to manually cause the self-diagnostic circuit to terminate the rechargeable battery test that is in progress.

19. The linear light-emitting diode (LED) lamp of claim 1, further comprising an electric current distribution switch coupled to an input of the one or more LED arrays, wherein the one or more LED arrays comprise a first type of LEDs and a second type of LEDs respectively with a first correlated color temperature (CCT) and a second CCT, and wherein the electric current distribution switch is configured to distribute the second LED driving current to flow into the first type of LEDs and the second type of LEDs resulting in an apparent light emission at a third CCT as a result of color-mixing of light emissions from both the first type of LEDs and the second type of LEDs.

* * * * *